United States Patent
Gaeta

(10) Patent No.: US 11,869,017 B1
(45) Date of Patent: Jan. 9, 2024

(54) SYSTEMS AND METHODS FOR REMOTELY WITNESSING AND ELECTRONICALLY NOTARIZING A LEGAL INSTRUMENT

(71) Applicant: United Services Automobile Association, San Antonio, TX (US)

(72) Inventor: Michael Joseph Gaeta, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1557 days.

(21) Appl. No.: 14/301,367

(22) Filed: Jun. 11, 2014

(51) Int. Cl.
  *G06Q 30/018* (2023.01)
  *G06Q 50/18* (2012.01)
  *H04N 7/18* (2006.01)

(52) U.S. Cl.
  CPC .......... *G06Q 30/018* (2013.01); *G06Q 50/18* (2013.01); *H04N 7/183* (2013.01)

(58) Field of Classification Search
  CPC ...... G06Q 20/02; G06Q 50/18; G06Q 50/184; G06Q 50/188
  See application file for complete search history.

(56) References Cited

U.S. PATENT DOCUMENTS

| | | | | |
|---|---|---|---|---|
| 6,377,925 B1 * | 4/2002 | Greene, Jr. | ............ | G10L 21/06 704/235 |
| 7,127,406 B2 | 10/2006 | Triola | | |
| 8,185,743 B1 * | 5/2012 | Goott | ................... | G06Q 20/401 713/156 |
| 8,204,807 B2 * | 6/2012 | Triola | ................... | G06Q 20/10 705/35 |
| 8,966,597 B1 * | 2/2015 | Saylor | .................... | H04L 63/10 726/5 |
| 9,176,942 B1 * | 11/2015 | McLaughlin | ......... | G06F 40/166 |
| 2001/0047328 A1 | 11/2001 | Triola | | |

(Continued)

OTHER PUBLICATIONS

Reiniger, T., & Hansberger, R. (2011). Virtual Presence: Online notarization and the end of physical appearance in the digital age. Scitech Lawyer, 8(2), 16-21 (Year: 2011).*

(Continued)

*Primary Examiner* — Maria C Santos-Diaz
(74) *Attorney, Agent, or Firm* — BakerHostetler

(57) ABSTRACT

Described herein are systems and methods of facilitating remote notarization of electronic instruments and storing records memorializing these notarization events. A notarization system provider may capture video feeds from different angles, and combine the feeds into a single archive multimedia file, which may be stored as a secured record of a notarization. The notarization system may be utilized as an alternative to a conventional notarization settings involving a notary, in-person. The notarization system provider may supply a signing party with an electronic instrument, which could be any instrument requiring notarization to be effective. Parties signing the document may go to a system provider's location or representatives could bring the requisite devices to the signing parties. Cameras generate video feeds of the notary, the notary, and any witnesses, and then forward the feeds to other devices in the system, allowing each party to observe the signing party sign the instrument.

17 Claims, 3 Drawing Sheets

(56) References Cited

U.S. PATENT DOCUMENTS

| | | | |
|---|---|---|---|
| 2004/0260569 A1* | 12/2004 | Bell ...................... | G06Q 50/18 |
| | | | 705/311 |
| 2007/0078762 A1 | 4/2007 | Triola | |
| 2012/0072837 A1 | 3/2012 | Triola | |
| 2012/0233080 A1 | 9/2012 | Triola | |
| 2012/0296747 A1* | 11/2012 | Triola ................ | G06Q 30/0613 |
| | | | 705/14.66 |
| 2013/0039633 A1* | 2/2013 | Wong .................. | G06F 21/645 |
| | | | 386/224 |
| 2013/0262992 A1* | 10/2013 | He ........................ | G06Q 50/18 |
| | | | 715/255 |
| 2014/0214698 A1* | 7/2014 | Dejene ................ | G06Q 50/182 |
| | | | 705/309 |
| 2015/0026478 A1* | 1/2015 | Raduchel ............. | H04L 9/3247 |
| | | | 713/178 |
| 2015/0135300 A1* | 5/2015 | Ford ................... | H04L 63/0281 |
| | | | 726/11 |
| 2016/0020909 A1* | 1/2016 | Gardenes Linan ... | H04L 9/3247 |
| | | | 713/175 |
| 2018/0288040 A1* | 10/2018 | Kursun .............. | H04L 63/0861 |

OTHER PUBLICATIONS

NotaryCam, Sign It For Sure [online], [retrieved on Jul. 2, 2014]. Retrieved from the Internet :<URL:https://www.notarycam.com/>.
Settleware, Create. Consent. Close [online], [retrieved on Jul. 2, 2014]. Retrieved from the Internet:<URL:https://settleware.com/e-notary/>.

* cited by examiner

SYSTEMS AND METHODS FOR REMOTELY WITNESSING AND ELECTRONICALLY NOTARIZING A LEGAL INSTRUMENT

FIELD OF THE DISCLOSURE

The subject matter disclosed herein generally relates to facilitating remote execution and notarization of instruments.

BACKGROUND

Certain types of a legal instruments must be formally notarized according to jurisdictional rules. Notarization often requires that a signer and a notary be in the same room to allow the notary to adequately observe the signer execute the instrument. In many notarization scenarios, notaries and witnesses must be situated as to observe a signing party sign a document. In a conventional in-person setting for notarizations, the notary and any witnesses can observe the signer throughout the process of signing the document from before putting a pen to the document through the completion of the signer's signature. Moreover, observing a party throughout the signing process allows parties to determine whether the document was signed under duress, under the influence of a substance, and other observable facts that would undermine the signed document at some later date. Because the parties in conventional notarizations are capable of observing the entire signature, there is presumably confidence in any verification provided by the notary and witnesses with regards to the propriety of the signed document. However, in some cases, it may be inconvenient or infeasible find a notary or for a notary to observe the instrument be executed by a signing party.

What is needed is a means for facilitating remote viewing of signers who are executing a document so that a notary can be confident that the legal requirements for executing an instrument are satisfied.

Teleconferencing software harnessing the Internet may be employed so users may connect in real-time over any distance. However, conventional teleconferencing software may not be adequate for notarization because certain controls over the media may not be established to provide confident verification of a notarization event. Moreover, conventional teleconferencing software may not properly provide parties of a notarization event with adequate vantage points for determining whether signatures are applied; particularly with regards to the signature of the signing party. Conventional teleconferencing software may provide one or more multimedia videos to displays connected to the teleconference. However, conventional teleconferencing software fails to provide confident observable recordings for a plurality of events, to include a signer applying a signature.

What is needed is a means for receiving recordings of each party to a notarization event. What is needed is a means for observable synchronized playback of each party and the application of the signer's signature. What is needed is a means for securely storing the synchronized recordings to provide confident observable playback of each party and the signer's signature with relation to one another, throughout the course of a notarization event.

SUMMARY

Described herein are systems and methods of facilitating remote notarization of electronic instruments and storing records memorializing these notarization events, which address the above issues and provide a number of other benefits. A notarization system provider may capture video feeds from different angles, and combine the feeds into a single archive multimedia file, which may be stored as a secured record of a notarization. This system may be utilized as an alternative to a conventional notarization setting, occurring in-person with a notary. The notarization system provider may supply a signing party with an electronic instrument, which could be any instrument requiring notarization to be effective (e.g., banking forms, loans, insurance-related forms, wills, trusts, real property forms, deeds, personnel forms, contracts, background investigation forms, etc.). Parties signing a document may go to a system provider's location or representatives could bring the requisite devices to the signing parties.

In one embodiment, a computer implemented method of remotely notarizing instruments, the method comprises receiving, by a computer, from a signer computing device a signer feed video capturing a face of a signing party signing an electronic document, wherein the signer video feed is captured by a camera of the first computing device; and receiving, by the computer, from the signer computing device having an application creating an animation feed capturing a signature of the signing party on an electronic document; providing, by the computer, the electronic document to a notary computing device associated with a notarizing party; and receiving, by the computer, from the notary computing device the electronic document, wherein the electronic document is tagged with a notarizing token associated with the notary.

In another embodiment, a system for creating a computer file having a notarized electronic instrument, the system comprises a signer computing device comprising a video camera capturing a face of a signing party in a signer video feed and a processor continuously transmitting the signer video feed and a signature feed capturing a view of a signature block of an electronic document stored in a computer file; a notary computing device comprising a processor executing a notarization module attaching a notary token of a notary to the computer file; and a central computing device comprising a processor aggregating a plurality of video feeds received from a plurality of computing devices into a composite video and transmitting the composite video to one or more computing devices, and a non-transitory machine-readable storage medium storing the computer file containing the electronic document with the attached notarization token transmitted from the notary device.

In another embodiment, a system for generating and storing recordings of a notarization event comprising at least one processor executing a set of instructions stored in a non-transitory machine-readable storage medium, the processor executing the steps of: receiving a signer video feed from a camera associated with a signer computing device capturing a face of the signing party; receiving an animation feed from a software module executed by the signer computing device capturing a designated signature block of an electronic document, wherein the software module generates an animation displaying a signature of the signing party being applied to the signature block; continuously transmitting, the animation feed and the signer video feed to a notary computing device associated with a notary; transmitting the computer file containing the electronic document having the signature of the signing party to the notary computing device; receiving the computer file containing the electronic document having the signature of the signing party and a notarizing token associated with the notary; and storing the computer file, the animation feed, and the first video feed into an archive comprising a non-transitory machine-readable storage medium.

In another embodiment, a computer implemented method for preserving sessions of remote notarization events, the method comprises receiving, by a computer, a signer video feed capturing a face of a signing party from a signer computing device, wherein the signer video feed is captured by a camera of the first computing device; receiving, by the computer, an animation feed from the signer computing device capturing a signature of the signing party on an electronic document; simultaneously transmitting, by the computer, the animation feed and the signer video feed to a notary computing device associated with a notary; presenting, by the computer, the electronic document having the signature of the signing party to the notary computing device; and receiving, by the computer, the electronic document from the notary computing device, wherein the electronic document is tagged with a notarizing token associated with the notary.

In another embodiment, a system for creating a computer file preserving notarization of an electronic instrument, the system comprising: a signer computing device comprising a video camera capturing a face of a signing party in a signer video feed and a processor continuously transmitting the signer video feed and a signature feed capturing a view of a signature block of an electronic document stored in a computer file; a notary computing device comprising a processor executing a notarization module attaching a notary token of a notary to the computer file; a central computing device comprising a processor aggregating a plurality of video feeds received from a plurality of computing devices into a composite video and transmitting the composite video to one or more computing devices, and a non-transitory machine-readable storage medium storing the computer file containing the electronic document with the attached notarization token transmitted from the notary device; and an archive database storing the composite video comprising each of the feeds in a non-transitory machine-readable storage memory.

In another embodiment, a system for generating and storing recordings of a notarization event, the system comprising at least one processor executing a set of instructions stored in a non-transitory machine-readable storage medium, the processor executing the steps of receiving a signer video feed from a camera associated with a signer computing device capturing a face of the signing party; receiving an animation feed from a software module executed by the signer computing device capturing a designated signature block of an electronic document, wherein the software module generates an animation displaying a signature of the signing party being applied to the signature block; continuously transmitting, the animation feed and the signer video feed to a notary computing device associated with a notary; transmitting the computer file containing the electronic document having the signature of the signing party to the notary computing device; receiving the computer file containing the electronic document having the signature of the signing party and a notarizing token associated with the notary; and storing the computer file, the animation feed, and the first video feed into an archive comprising a non-transitory machine-readable storage medium.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

Figure 1:
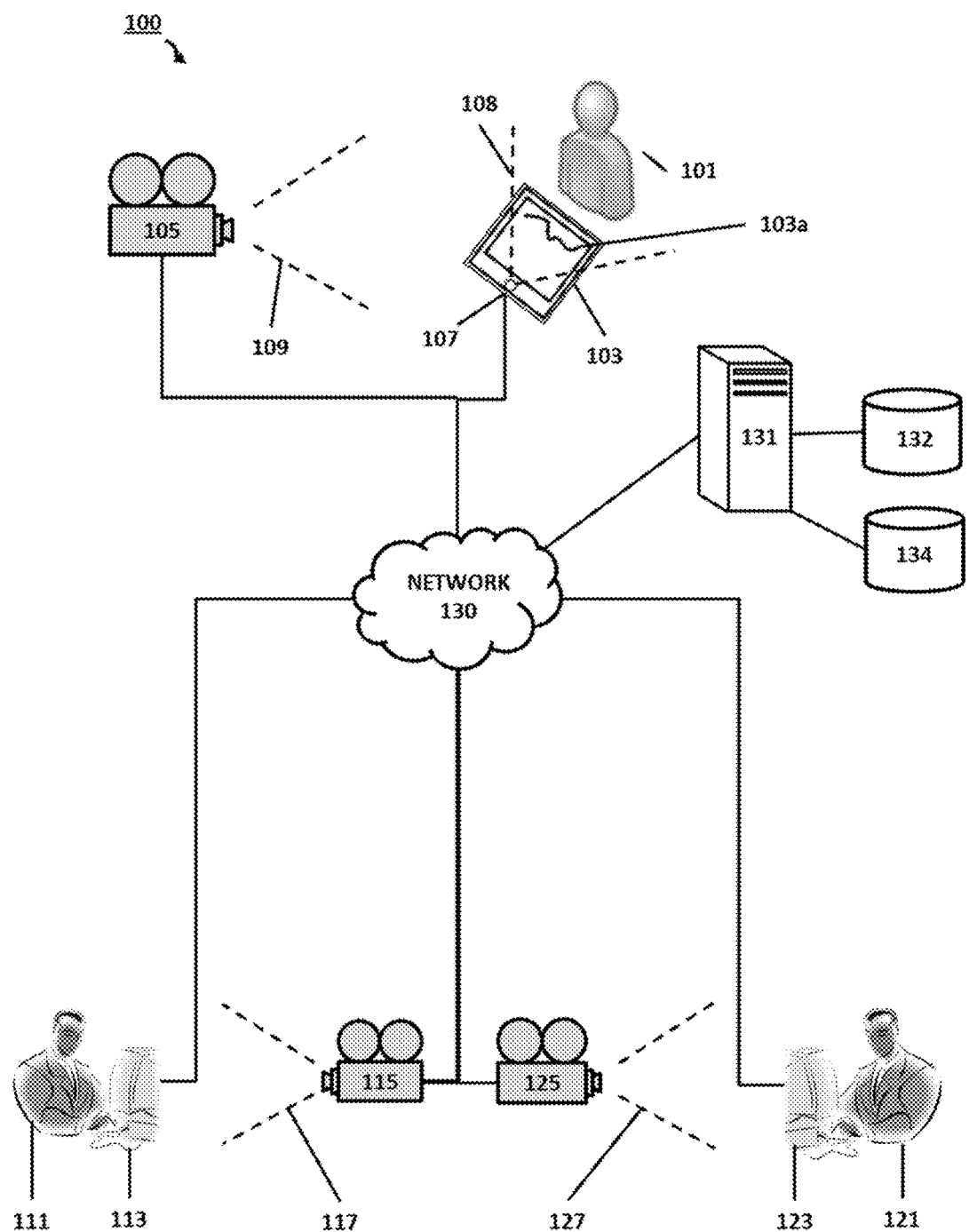
FIG. 1 shows an exemplary system embodiment of a remote notarization system.

Numerous other aspects, features and benefits of the present disclosure may be made apparent from the following detailed description taken together with the figures.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

FIG. 1 shows an exemplary system embodiment of a remote notarization system 100. The exemplary embodiment of the notarization system shown in FIG. 1 comprises a signer device 103 operated by a party executing an instrument ("signer") 101, a signer camera 105 capturing view of the signer 101 executing the instrument, a notary device 113 operated by a notary 111, a notary camera 115 capturing a view of the notary 111, a witness device 123 operated by a witness 121, a witness camera 125 capturing a view of the witness 121, a network 130, a server 131 of the service providing the notarization system 100, an associated archive database 132 storing records of prior notarization events, and an associated service database 134.

Party Executing Instrument and Associated Devices

A signer 101 may be a person who is intending to execute (e.g., sign, apply identifying mark) an instrument (e.g., contract, deed, authorization form, will). The instrument may originate as an electronic document, or the instrument may be a paper document that has been converted or scanned into an electronic document format. The signer 101 may contact a provider of remote notarization services. The service provider may be a dedicated provider of such notarization services, a financial institution, a lender, or other entity that may facilitate electronic notarization described herein.

Embodiments of a notarization system 100 may comprise a signer device 103, which may be a computing device associated with a signer 101. The signer device 103 may be any computing device comprising processors and software modules capable of executing various processes and tasks as described herein.

In some embodiments, the signer device 103 may be a computing device (e.g., a personal computer, tablet computer, mobile phone, smart phone, workstation) comprising a touch-sensitive input (e.g., monitor display, touchpad) capable of receiving user input controlling operation of the signer device 103. Although the exemplary embodiment recites the use of a touch-sensitive input, the signer device 103 may use a stylus, keyboard, keypad, motion sensor, or biometric reader. Using the signer device's 103 touch-sensitive input, the signer 101 may interact with graphical user interfaces (GUIs) presented by the signer device 103 by applying pressure to the touch-sensitive input in any number ways (e.g., finger, stylus).

In some embodiments, a signer device 103 may comprise a camera 107 capable of capturing a video of the signer 101 who is operating the signer device 103 to execute an instrument, or signer feed 108. In some cases, a jurisdiction may determine what must be captured by the camera 107 for the signer feed 108. For example, a jurisdiction may require the signer feed 108 capture a video of the signer's 101 face throughout the act of executing the instrument, from a moment when the signer 101 begins execution to a moment when the signer 101 completes execution. As another example, a jurisdiction may require a snapshot of the signer's 101 face at the beginning of execution, end of execution, or both. As another example, a jurisdiction may require a predetermined minimum resolution for the signer feed 108. As another example, the jurisdiction may specify point at which the camera may 107 may begin recording the signer feed 108 and when the camera 107 may cease recording.

In some embodiments, a camera 107 may be integrated into a signer device 103. In some embodiments, the camera 107 may be an external device connectable, by cord or wirelessly, to the signer device 103. Operation of the camera 107 may be driven by an input/output (I/O) interface of the signer device 103 for operating the camera 107 in association with the signer device 103. In some embodiments, the signer device 107 may store all or a portion of the signer feed 108 in a buffer memory that may be a non-transitory machine-readable storage medium for storing the entire, or portion of, signer feed 108 until a predetermined condition is satisfied for transmitting the signer feed 108 to various devices of the system 100, over a network 130 (e.g., buffer size, timing). The signer feed 108 stored in the buffer may be transmitted as a package to the various device. In some embodiments, the signer device 103 may transmit stream the signer feed 108 over the network 130, in near real-time, to the various devices of the system 100. In some embodiments, the signer device 103 may timestamp the signer feed 108. Timestamping may be any means for distinguishably marking moments in the signer feed 108. As described later, feeds 108, 109, 117, 127 may be timestamped for synchronizing each of these feeds 108, 109, 117, 127. Synchronization may include synchronized recording of the feeds 108, 109, 117, 127, synchronized playback of the feeds 108, 109, 117, 127, or both.

In some embodiments, the signer device 103 may execute a notary application, which may be a software application facilitating the notarization process that is executed by a processor of the signer device 103. In some embodiments, the notary application may provide a closed environment, or otherwise logically isolated environment, within the signer device 103. The closed environment may prohibit the signer 101 from accessing other available functionality of the signer device 103 that is external to the notary application. The closed environment may prohibit other hardware and/or software resources of the signer device 103 from accessing the electronic instrument, data associated with the notary application, and/or software components affiliated with the notary application.

In some embodiments, data associated with the notary application may be stored locally, in a memory of the signer device 103. In some embodiments, data associated with the notary application may be stored in an archive database 132 that may be accessed by the notary application over a network 130. Non-limiting examples of data associated with the notary application may include a signer profile, an electronic instrument to be remotely executed and notarized, and log files relating to signing events. The closed environment of the notary application may provide a secure way for a signer 101 to access an electronic instrument over the Internet or other network 130. Using the notary application, the signer 101 may be authenticated by a central server 131 using predefined credentials provided by the notary service provider. Once authenticated, the central server 131 may provide the notary application with the electronic instrument to be executed. The notary application may then work in along with the central server 131 to create an interactive instance of a signing event between various computing devices 103, 113, 123 and corresponding cameras 105, 107, 115, 125, during which the electronic instrument may be executed by the signer 101 in view of a notary 111, and in some cases, a witness 121. In some embodiments, communications between the signer device 103 and computing devices 113, 123, 131 may be encrypted using any encryption methodologies and devices capable of encrypting such communications transmitted over the network 130.

In some embodiments, a notary application executed by the signer device 103 may generate an animation feed 103a recording a mark identifying a signer 101 being applied, by the signer 101, to an electronic instrument. The animation feed 103a may be in any machine-readable format capable of displaying, during playback, an animation of the signer's 101 mark being applied to the electronic instrument. For example, the animation feed 103a may be stored in an animated graphics interchange format (GIF) image, moving picture experts group (MPEG), or other animation in a machine-readable format that may be generated from the signer 101 applying the signer's 101 identifying mark onto the pressure-sensitive interface of the signer device 103 in order to execute the instrument.

In some embodiments, a notary application executed by the signer device 103 may display on a user interface of the signer device 103, the electronic instrument for the signer 101 for review. In some cases, a signature block may be found at one or more places in the electronic instrument, and in some cases the electronic instrument may require initials from one or more parties (e.g., signer 101, notary 111). As such, some embodiments of the notary application may capture each of the executing marks being applied and each of the initials being applied as a set of one or more animation feeds 103a. Depending upon jurisdictional rules, such embodiments of the notary application may perform various tasks for preserving the set of animation feeds 103a. For example, the set of animation feeds 103a may be brought together into, or generated as, a single continuous playback that may be synchronized with other feeds 108, 109, 117, 127. As another example, each of the marks and initials may be kept separated as distinct animation feeds 103a such that playback is synchronized with other feeds 108, 109, 117, 127.

As mentioned previously, various portions of data associated with the notary application and notarization process may be stored in non-transitory machine-readable storage media located on one or more physical devices. Similarly, various software modules associated with the notary application and notarization process may be stored on, and executed by, one or more physical devices. That is, embodiments of the remote notarization system 100 may divide functionality between the notary application and a central server 131 across a spectrum. For example, some embodiments of the notary application may be a thin client having limited functionality without connecting to the central server 131 and potentially storing little data locally. In such an example where the notary application functions as a thin client, the notary application connects to the central server 131 that may provide the desired execution functionality to the notary application. Then, the notary application may access certain assets of the system 100 (e.g., archive database 132, service database 134) and other stored data records associated with the notarization process. In some embodiments, the notary application comprises one or more software modules that may be stored and executed locally and allow the signer device 103 and notary application to provide certain functionalities. In some embodiments, the notary application may store, among other items, the electronic instrument to be executed, and various feeds 103, 103a, 109 associated with the signer 101. Moreover, in such exemplary embodiments of the notary application (executing comparatively more functionality than a thin client), data associated with the signer 101 (e.g., instrument) may be stored on the signer device 101. It is to be appreciated that the division of components and assets as described herein are not intended to be limiting to potential embodiments. It is to appreciated that data associated with the notarization process, data associated with the signer 101, and software modules effectuating the electronic notarization process, may be stored on any number devices in the notarization system 100 and executed by any number of devices in the notarization system 100.

Embodiments of a notarization system 100 may comprise a signer camera 105 capturing a third view feed 109 of the signer 101 executing the instrument. In some cases, this third view 109 may have a perspective aside from the signer feed 108 captured by the camera 107 of the signer device 103, and a perspective aside from the animation feed 103a captured by the notary application through the pressure-sensitive interface of the signer device 103. That is, taken from the perspective of the signer 101, the third view feed 109 captured by the signer camera 105 may be considered to be a third-person view of the signer 101, whereas the animation feed 103a may be considered to be a first-person view from the perspective of the signer 101.

In some embodiments, the signer camera 105 capturing a third view feed 109 may be communicatively connected to a signer device 103. In such embodiments, a notary application executed by the signer device 103 may control the signer camera 105 for synchronizing one or more feeds 103a, 108, 109. In some embodiments, the notary application may encrypt a binary bit stream of the third view feed 109 before transmitting the third view feed 109 over a network 130. In some embodiments, the signer camera 105 may be communicatively connected, over the network 130, to a the central server 131. The central server 131, in some embodiments, may then transmit the third view feed 109 to devices 113, 123 that may in turn display a playback of the third view feed 109 to a witnessing party 111, 121, who may include a notary 111 and one or more witnesses 121. In some embodiments, the signer camera 105 may transmit, over the network 130, the third view feed 109 directly to devices 113, 123 of witnessing parties 111, 121 and the central server 131.

It is to be appreciated that embodiments of the signer camera 105 may be any physical device capable of executing the tasks described herein, such as a digital recording camera, a camera integrated into a computing device, a portable device comprising an integrated camera, and the like. It is to be appreciated that the camera 105 need not be a digital camera, but may record in an analog fashion such that the recording of the third view feed 109 may be later converted to a digital format. It is to be appreciated that, in some cases, the signer camera 105 may be the signer-device camera 107 capturing a signer feed 103. It is also to be appreciated that, in some cases, the signer camera 105 and the signer-device camera 107 may be distinct devices, each capturing comparatively similar views of the signer 101, thereby providing a level of redundancy.

Notary and Associated Devices

Embodiments of a notarization system 100 may comprise a notary device 113 associated with a notary 111 who is intended to notarize an electronic instrument (e.g., contract, loan, deed, will) in accordance with specified rules of a jurisdiction. It should be appreciated that embodiments of the notary device 113 may be any computing device comprising a processor capable of performing various tasks and functions described herein.

A notary device 113 may be configured to display an animation feed 103a, a signer feed 108, and a third view feed 109 on a monitor for a notary 111 to witness a signer 101 executed an electronic instrument. Upon satisfactorily witnessing the signer 101 execute the instrument in accordance with jurisdictional rules, the notary 113 may apply a jurisdictionally-issued notary stamp to the electronic instrument, thereby notarizing the electronic instrument.

In some embodiments, a notary device 113 may execute a notary application associated with the notarization system 100. The notary application executed by the notary device 113 may functional differently from a notary application executed by other devices in the system 100, such as a signer device 103. In some embodiments, the notary application executed by the notary device 113 may create a closed environment on the notary device 113 such that the notary 111 is unable to access other services that may reside on the notary device 113. Likewise, in some embodiments, the notary application may prohibit other services that reside on the notary device 113 from accessing computer-files and data associated with the notarization system 100 accessed by the notary application.

In some embodiments, the notary application may be cloud-based. That is, various data and software modules associated with the notary application may reside on a central server 131 such that few, if any, data files and/or software modules reside on the notary device 113. In these embodiments, the notary 111 may access the notary application using a software application of the notary device 113 capable of accessing remote computing services (e.g., a web browser, a remote desktop). In some embodiments, the notary application is a computer program installed on the notary device 103 such that many notary application functions are performed by the notary device 103. In these embodiments, outputs introduced into a network 130 by the notary application (i.e., camera feeds, electronic instrument) may be streamed to the central server 131, which in turn performs various aggregation functions using data streamed from a plurality of devices 103, 113, 123.

The notary device 113 may apply a notarizing token to an electronic instrument upon receiving a notarization command from a notary. The notarizing token may be any means for digitally notarizing the electronic instrument. Non-limiting examples of a notarizing token may include a public key of an asymmetric encryption key-pair, a digital signature, a hash value, and a watermark, among others. In some embodiments the notarizing token may be appended to the electronic instrument, such the digital signature. In some embodiments, the notarizing token may comprise a plurality of technologies for indicating the electronic instrument was notarized. For example, the notary 111 may apply a digital watermark image uniquely associated with the notary 111, and then a hash may generated, after application of the watermark, such that the now notarized electronic instrument cannot be altered without also altering the hash.

In some cases, a governing jurisdiction may prescribe rules governing technology for digitally notarizing electronic instruments. As an example, the jurisdiction have rules for controlling distribution of notarizing tokens. As another example, the jurisdiction may explicitly prescribe the technology underlying the notarizing token (e.g., asymmetric encryption certificates, watermarks). In some embodiments, the notarizing token may identify the governing jurisdiction under which the instrument is executed. In some embodiments, the notarizing token may identify the governing jurisdiction under which the notary 111 is licensed. In some embodiments, distribution of notarizing tokens may be controlled by various systems of the governing jurisdiction (not shown).

In some embodiments, a notarizing token may be associated with a jurisdiction, and may also uniquely identify a notary 111, thereby prohibiting the notary 111 from being able to later repudiate the notarization and prohibiting forgery of notarization. In some embodiments, information related to the notarization event (e.g., date, time, witnesses, nature of the instrument) may be included with the notarization token. That is, when the notary 111 notarizes the electronic instrument, the notary application or other software module of the notary device 113 (e.g., device clock), may capture information related to the notarization event. Such event information may be appended to the computer file containing the electronic instrument and/or may be stored as an associated computer file.

In some embodiments, notarization of the electronic instrument is performed by a notary 111 using a notary application with an interface for allowing the notary 111 to apply a notarization token to an electronic instrument. For some embodiments in which the notary application is cloud-based, i.e., an electronic instrument is transmitted to a central server 131 to be notarized, the notary device 113 may issue a notarization command to the central server 131. In response to the receiving a valid notarization command, the central server 131 may apply the notarization token. It should be appreciated that in some embodiments, a notary device 113 may receive an executed electronic instrument from a signer 101 and then apply the notarization token.

Since notarizing tokens may be kept secured, or otherwise controlled, various embodiments may facilitate access to the notarizing tokens in various ways. In some embodiments, a notarizing token may be distributed to a notary 111 who may identify one or more machines (e.g., notary device 113) expected to be used for applying the notarizing token. Thus, the notarization token may be stored on any non-transitory machine-readable storage medium (e.g., computer hard drive, thumb drive, CD-ROM), but the notarizing token may not be applied or accessed when not being used by one of the identified machines. In some embodiments, the notarization token may be stored on a non-transitory machine-readable storage medium under the control of the governing jurisdiction. In these embodiments, the notarization token may be retrieved by the notary application or some other service when the notary 111 wants to apply the notarizing token.

In some embodiments, a user interface may display an electronic instrument having one or more images associated with the notarizing token, after the notarizing token is applied. Non-limiting examples of such images may include, a notary's signature 111, and a jurisdiction's seal, among others. The notarizing token may be machine-readable bits of information added to the existing machine-readable bits of the electronic instrument such that the resulting amalgamation of bits may provide for transferring, storing, and verifying digitized versions of electronic instruments. However, machine-readable bits are often not easily reviewed by humans. Embodiments adding a visual representation of a notary seal provide notarized electronic instruments with a human-relatable aesthetic similar to a paper or hardcopy instrument. In some embodiments, the notarized electronic instrument may be printed to hardcopy or converted to another file format, but maintain the visual representations related to the notarization and any other executing marks.

Embodiments of an electronic notarization system may comprise a notary camera 115 capturing a notary feed 117, which may show a notary 111 during a notarization event during playback. The notary feed 117 may capture enough video of the notary 111 to satisfy jurisdictional rules. The notary feed 117 may capture the notary 111 from a beginning of the notarization event (i.e., before a signer 101 executes an electronic instrument). And, the notary feed 117 may capture the notary 111 starting from some particular moment, such as when the notary device 113 receives the executed electronic instrument from the singer device 103.

In some embodiments, a notary camera 115 may be communicatively connected to a notary device 113. In such embodiments, a notary application executed by the notary device 113 may control the notary camera 115, such as determining when the notary camera 115 may begin recording a notary feed 117, and synchronizing the notary feed 117 with one or more feeds 103*a*, 108, 109 captured by the system 100. In some embodiments, the notary application may encrypt a binary bit stream of the notary feed 117 for securely transmitting the notary feed 117 over a network 130. In some embodiments, the signer camera 105 may be communicatively connected over the network 130 to a the central server 131. The central server 131, in some embodiments, may then transmit the notary feed 117 to other devices 103, 123 in the system 100. Such other devices 103, 123 may display to a signer 101 and/or a witness 121, a real-time playback or a pre-recorded playback of the notary feed 117. In some embodiments, the notary camera 115 may transmit, over the network 130, the notary feed 117 directly to other devices 103, 123 in the system 100, and the central server 131.

It should be appreciated that embodiments of a notary camera 115 may be any physical device capable of executing tasks and processes described herein. Examples of the notary camera 115 may include a digital recording camera, a camera integrated into a computing device, a portable device comprising an integrated camera, and the like. It is to be appreciated that the notary camera 115 need not be a digital camera, but may instead record in an analog fashion such that the recording of the notary feed 117 may be later converted to a digital format.

Witnesses and Associated Devices

Jurisdictions may require that one or more witnesses 121 observe the execution of a instruments. Some embodiments of the system 100 may facilitate satisfaction of such jurisdictional requirements for witnesses 121 to observe a signer 101 executing an instrument. Using a witness device 123, a witness 121 may observe real-time or recorded playbacks from one or more feeds 103a, 108, 109 capturing various perspectives of the signer 101 executing an electronic instrument. The witness 121 may then apply a mark (e.g., electronic signature, asymmetric encryption certificate) verifying that the witness 121 observed the signer 101 execute the electronic instrument.

Embodiments of a notarization system 100 may comprise a witness device 123, which may be a computing device associated with a witness 121. It should be appreciated that the witness device 123 may be any computing device comprising processors and software modules capable of performing various processes and tasks as described herein. In some embodiments, the witness device 123 may comprise a touch-sensitive input means (e.g., monitor display, touchpad) capable of receiving user input controlling operation of the witness device 123. Using the witness device's 123 touch-sensitive input means, the witness 121 may apply a verifying mark by applying pressure to the touch-sensitive input (e.g., finger, stylus).

In some embodiments, the witness device 123 may execute a notary application, which may be a software application facilitating the notarization process. In some embodiments, the notary application on the witness device 123 may provide a closed environment, or otherwise logically isolated environment, in the witness device 123. The closed environment may prohibit the witness 121 from accessing other available functionality of the witness device 123 that is external to the notary application. The closed environment may prohibit other hardware and/or software resources of the witness device 123 from accessing the closed environment, including the electronic instrument, data associated with the notary application, and/or software components affiliated with the notary application. In some embodiments, data associated with the notary application of the witness device 123 may be stored in a memory of the witness device 123. In some embodiments, data associated with the notary application may be stored in an archive database 132 that may be accessed by the notary application over a network 130. Non-limiting examples of data associated with the notary application may include a signer profile, an electronic instrument to be remotely executed and notarized, and log files relating to notarization events.

In some embodiments, a notary application of the witness device 123 may provide a secure way for a witness 121 to remotely connect to a notarization event using the witness device 123. The notary application may provide access to one or more notarization event feeds 103a, 108, 109, 117, an electronic instrument, and other information relating to the notarization event. In some embodiments, the witness 121 may be authenticated by a central server 131 using predefined credentials provided by a notary service provider hosting the notarization event. In some embodiments, after the electronic instrument is executed, the central server 131 may provide the witness device 123 with access to the electronic instrument.

In some embodiments, a notary application of a witness device 123 may join a notarization session hosted by a central server 131. The notarization session may be an interactive user interface representing a notarization event. The notarization session for the notarization event may host various computing devices 103, 113, 123 and the corresponding cameras 105, 107, 115, 125, during which the electronic instrument may be executed by the signer 101 in view of the witness 121. In some embodiments, communications between the witness device 123 and other computing devices 113, 131 may be encrypted by any encryption methodologies and encryption devices capable of encrypting such communications.

A notary application of the witness device 123 may display on a user interface of the witness device 123, the electronic instrument in order for the witness 101 to apply a corresponding verifying mark to the electronic instrument. It should be appreciated that in some cases the verifying mark of the witness 121 may be applied to other locations (e.g., addendum to electronic instrument, associated computer file listing witnesses) using the witness device 123.

Embodiments of a notarization system 100 may comprise a witness camera 125 for capturing a witness feed 127 may be communicatively connected to a witness device 123. In such embodiments, a notary application of the witness device 123 may control operation of the witness camera 125. For example, the notary application may determine when the witness camera 125 may begin capturing the witness feed 127. In some embodiments, various functions of the notary application of the witness device 123 and/or various operations of the witness camera 125 may be remotely controlled by an administrator of the system 100. In some embodiments, the notary application of the witness device 123 may encrypt a binary bit stream of the witness feed 127 before transmitting the witness feed 127 over a network 130. In some embodiments, the signer camera 105 may be communicatively connected to a central server 131. The central server 131, in some embodiments, may then transmit the witness feed 127 to other devices 113, 123 that may in turn display a real-time or recorded playback of the witness feed 127. In some embodiments, the witness camera 125 may transmit the witness feed 127 to other devices 113, 123 in the system 100 and the central server 131.

It is to be appreciated that embodiments of the witness camera 125 may be any physical device capable of executing processes and tasks described herein. Examples may include a digital recording camera, a camera integrated into a computing device, a portable device comprising an integrated camera, and the like. It is to be appreciated that the witness camera 125 need not be a digital camera, but may record in an analog fashion such that the recording of the witness device 123 may later be converted to a digital format.

Other System Components

A network 130 may provide for communications between each of the devices in a system 100. The network 130 may be a public network (e.g., Internet), a private network (e.g., intranet), and any combination thereof. The network 130 may comprise one or more computing devices capable of facilitating the communications in and amongst the devices of the system 100. Non-limiting examples of devices of the network 103 may include routers, switches, firewalls, proxy servers, hubs, and the like. In some embodiments, there may be a plurality of networks. For example, in certain embodiments an archive database 132 may communicatively coupled with the central server 131 over a second private network that may be inaccessible to the other devices in the system 100 that are communicating over a first network 130.

Embodiments of an electronic notarization system 100 may comprise a central server 131, which may be any computing device comprising processors and non-transitory machine-readable storage medium capable of performing tasks and processes described herein. The central server 131 may authorize each of the parties 101, 111, 121 to a notarization event and provide each of the devices 103, 113, 123 with access to the requisite feeds. The central server 131 may provide the devices 103, 113, 123 with access to the electronic instrument.

In some embodiments, a central server 131 may comprise webserver services for hosting a website hosting a notarization session providing a user interface to various devices 103, 113, 123 in the system 100 that facilitates electronic notarization. In some embodiments, the central server 131 may authenticate parties 101, 111, 121 intending to join the notarization session. In some embodiments, the central server 131 may host a cloud-based notary application that may be accessed by each of the devices 101, 111, 121. In such embodiments, the devices 103, 113, 123 may operate as thin clients accessing the web-based notary application through a software application capable of accessing the web-based notary application (e.g., web browser, remote desktop).

As previously mentioned, one or more devices 103, 113, 123 of an electronic notarization system 100 may comprise a notary application that may interact with a central server 101. Embodiments of the notary application may be designed for execution on the particular device. For example, a signer device 103 may be tablet device (e.g., Apple iPad®, Microsoft Surface®) and thus the embodiment of the notary application may be a version of the notary designed to be executed on the particular tablet. Likewise, a notary device 113 may be a personal workstation computer, which may execute a version of the notary application designed for the workstation computer. In cloud-based implementations presenting a web-based notary, the notary application may be presented to the device 103, 113, 123 based on formatting requirements associated with the web-browser executed by the device 103, 113, 123. The central server 131 may determine which web-browser or type of device is being used to access the notary application, and then the notary application may be presented to the device 103, 113, 123 based on the web-browser. For example, the interface for the web-based notary application presented to a mobile tablet may be different than the interface for the web-based notary application presented to a workstation computer.

A notarization system 100 may comprise an archive database 132. An archive 132 may be one or more computing devices comprising processors, software modules, and non-transitory machine-readable storage media capable of performing the various processes and methods described herein. In some embodiments, the archive 132 may reside on the central server 131, and in some embodiments the archive 132 may be connected to the central server 131 over a network 130, such as a local area network (LAN), metropolitan area network (MAN), wide area network (WAN), or any other means for establishing a connection between the central server 131 and the archive 132. It should be appreciated that the archive 132 may comprise one computing device (e.g., central server 131, a dedicated server), or the archive 132 may comprise a plurality of computing devices in a distributed-computing environment.

An archive 132 may store multimedia feeds 103a, 108, 117, 127 generated by the system 100 capturing one or more parties during a notarization event from a given perspective. A central server 131 may receive feeds 103a, 108, 117, 127 from devices 103, 113, 123 in the system 100, and then forward those feeds 103a, 108, 117, 127 to the archive 132 for storage. In some embodiments, the archive 132 may be tasked with maintaining records associated with the notarization, such as the identification of the parties, the nature of the instrument being executed, and other information for memorializing the event. For example, should litigation arise with regards to the instrument executed during a prior notarization event, the parties may consult the archive 132 for retrieving the feeds 103a, 108, 117, 127 and the other records of information associated with the notarization event. The archive 132 may store feeds 103a, 108, 117, 127 as individual files, which may be timestamped, indicating during playback when each of the respective events, captured in each feed 103a, 108, 117, 127, is happening with respect to another. In some embodiments, the feeds 103a, 108, 117, 127 may be synchronized multimedia and played back on a user interface accordingly. The central server 131 and/or archive 132 may stitch the feeds 103a, 108, 117, 127 together into a single multimedia file, thereby displaying the feeds 103a, 108, 117, 127 within frames that partition a single playback window, as exemplified by FIG. 2.

A service database 134 may be any computing device comprising processors, software modules, and non-transitory machine-readable storage capable of performing the various processes and tasks as described herein. In some embodiments, the service database 134 may reside on the central server 131, and in some embodiments the service database 134 may be connected to the central server 131 over a network 130, such as a local area network (LAN), metropolitan area network (MAN), wide area network (WAN), or some other means for establishing a connection between the central server 131 and the service database 134. It should be appreciated that the service database 134 may reside on one computing device (e.g., central server 131, a dedicated server), or the service database 134 may comprise a plurality of computing devices in a distributed-computing environment.

The service database 134 may store information associated with a notarization event and may be accessed by one or more devices 103, 113, 123 of the notarization system 100. The service database 134 may store records associated with preparing for and conducting the associated notarization event, such as notarization event profiles and party profiles. Notarization event profiles may comprise, for example, data identifying the parties, the devices, jurisdictional rules for adequate notarization, the electronic instrument, and the like. Party profiles may comprise information identifying a party, authentication data for a party (e.g., user credentials), the role of a party, and other information regarding a party. It should be appreciated that data stored in the service 134 may be stored using any organization, ontology, and taxonomy, as selected by administrators of the notarization system 100.

A notarization event record may be created in the service database 134 in anticipation of the notarization event. The record may identify a signer 101, a notary 113, and a witness 121. The service database may store authenticating credentials for each of the parties in the service database 134, which may be accessed later by the central server 131 to authenticate the parties when the notarization event launches. After the notarization event record is created in the service database 134, the service database 134 may receive and store an electronic instrument to be executed. When the notarization event launches, the central server 131 may retrieve the electronic instrument from the service database 134 and then provide the electronic instrument to a notary application of a signer device 103. In some embodiments, the service database 134 may store materials in preparation of notarization events, and an archive database 132 may securely store feeds 103a, 109, 117, 127 and other information relating to completed notarization events. It should be appreciated that embodiments of the service database 134 and archive 132 may be a single device or distinct devices. It should be appreciated that the service database 134 and archive 132 may distribute one or more tasks in ways varying from descriptions provided herein.

Archive Database

Figure 2:
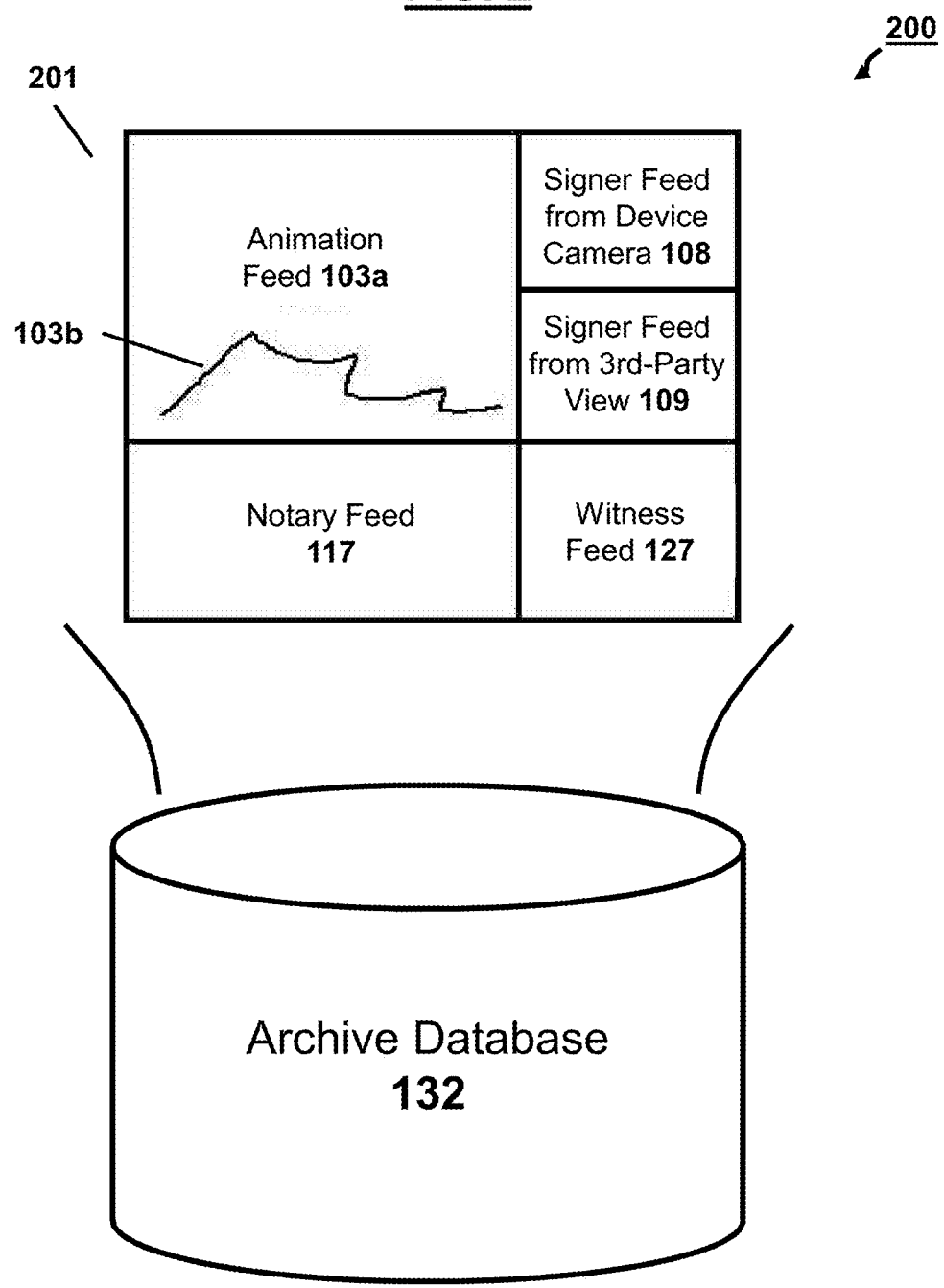
FIG. 2 shows an exemplary archive database of a system embodiment of an remote notarization system.

FIG. 2 shows an exemplary system embodiment of an electronic notarization system 200 capable of archiving notarization events. The exemplary system 200 may comprise an archive database 132 storing records 201 of notarization events. Records 201 may comprise one or more recordings of various feeds 103*a*, 108, 109, 117, 127 capturing parties involved with a notarization event. Examples of the parties may include a signer 101 executing an electronic instrument, a notary 111 notarizing the electronic document, and a witness 121 observing the notarization event.

An archive database 132 comprising non-transitory machine-readable storage medium may store records 201 of notarization events, and may transmit the stored records 201 to various devices of the system 200, or may be accessed later by a device unrelated to the system 200. In some embodiments, the archive 132 may reside on a central server 131. In some embodiments, the archive 132 may communicate with a central server 131 over a network 130. The central server 131 may receive feeds 103*a*, 108, 109, 117, 127 from various computing devices and transmit the feeds 103*a*, 108, 109, 117, 127 to the archive 132 for storage. The central server 131 may fetch the feeds 103*a*, 108, 109, 117, 127 from the archive 131 for review at some later time. In some embodiments, records 201 stored by the archive may be encrypted. The central server 131 and/or the archive 132 may perform the requisite encryption and decryption of records 201 when storing the records into the archive 132 or when retrieving records 201 from the archive 132.

Records 201 may be generated by a computing device in the system 200. In some embodiments, a notary application residing on a computing device in the system 200. In some embodiments, records may be generated by stitching together feeds 103*a*, 108, 109, 117, 127 captured by corresponding cameras 105, 107, 115, 125. Feeds 103*a*, 108, 109, 117, 127 may be stored in a multimedia file format capable of being stored on the archive 132, such that records 201 may be played back on a computer capable of viewing the file format.

Records 201 may be displayed during a notarization event so that each of the parties 101, 111, 121 may view the notarization event. Records 201 may be played back for later review on any capable computing device. In some embodiments, records 201 may be displayed on a user interface as a single box containing frames for various feeds 103*a*, 108, 109, 117, 127, as shown by FIG. 2. Records 201 may also be displayed sequentially, as a continuous recording. In some embodiments, the feeds 103*a*, 108, 109, 117, 127 of a record 201 may be timestamped for facilitating synchronized recording and/or playback. When stitching together a record 201, the timestamps may be reviewed to determine appropriate synchronization.

In the exemplary embodiment of FIG. 2, a record 201 is stored in an archive database 132. The record 201 is a multimedia computer file comprising an animation feed 103*a* captured by a signer device, a signer feed 108 captured by a camera of the signer device, a signer feed captured by a camera associated with the signer, a notary feed 117 captured by a camera associated with a notary, and a witness feed 127 captured by a camera associated with a witness. A central server may received the feeds 103*a*, 108, 109, 117, 127 from the respective devices as separated video streams or multimedia files. The central server may synchronize the feeds 103*a*, 108, 109, 117, 127 using a timestamp, and then stitch the synchronized feeds 103*a*, 108, 109, 117, 127 together into a single multimedia computer file, i.e., the record 201. The feeds 103*a*, 108, 109, 117, 127 may be stitched together for the record such that playback of the record displays a single frame comprising a set of composite frames, where each frame displays one of the respective feeds 103*a*, 108, 109, 117, 127. The central server may then provide the record to the archive 132 for storage. Using a suitable encryption algorithm, the archive database may encrypt the record 201 using a key associated with the record 201. In situations requiring review of the record 201, the record 201 is decrypted according to the encryption algorithm used for encryption and provided to a computing device retrieving the record 201. The computing device may playback the record 201 using a suitable program, which may be a notary application associated with the system 200. The record 201 may display a recorded playback of the notarization event in a frame of the user interface, such that the frame comprises a set of composite frames each displaying one of the synchronized feeds 103*a*, 108, 109, 117, 127.

Exemplary Method of Providing a Notarization Event

Figure 3:
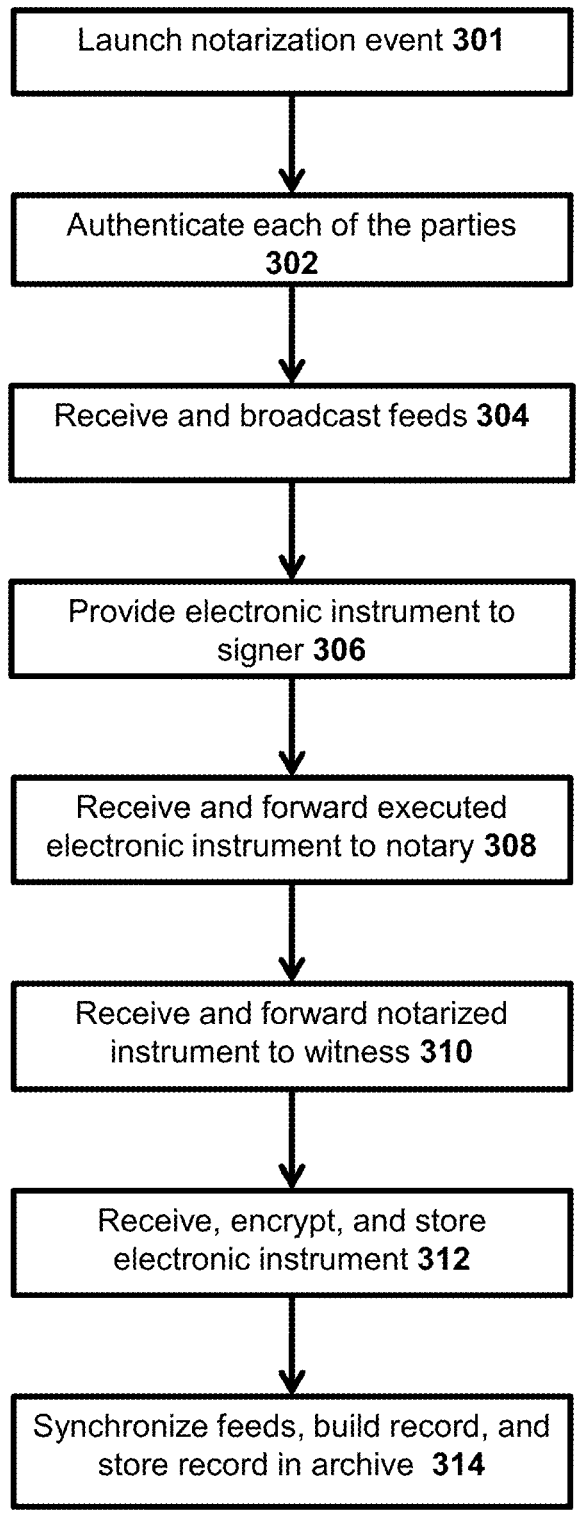
FIG. 3 shows an exemplary method embodiment for remote notarization.

FIG. 3 shows an exemplary method embodiment of an electronic notarization event 300. Executing an event 300 may comprise steps of launching the event 301, authenticating parties to the event 302, broadcasting feeds to parties' computing devices 304, providing a signer with an electronic instrument 306, forwarding the electronic instrument to a notary after the instrument is executed 308, forwarding the electronic instrument to a witness after the instrument is notarized 310, securely storing the notarized electronic instrument 312, and storing a record of the notarization event into an archive 314.

In step 301, a notarization event may be launched by a computing device associated with a party signing an electronic instrument (signer). A notarization system provider may provide software associated with a notarization system to the signer device, i.e., a notary application. The provider may likewise provide the computing devices of other parties to the notarization event with software to access the notarization system. The software provided to each of the parties may be tailored to the party based on each parties' respective role, or the software may be similar for each, however, each parties' rights may be restricted based on the role of the party. For example, a notary may be provided with a version that allows the notary to notarize an electronic instrument by applying the notary's notarization token. In this example, a witness may be restricted to only signing a particular portion of the electronic instrument for attesting to witnessing an appropriate execution of the instrument. The signer may establish a session on a central server for the notarization event, which each of the parties may access to view the notarization event.

In step 302, a central server may authenticate each of the parties attempting to access the session of the notarization event. Credentials used by parties for accessing the session may be provided ahead of time. For example, the system may provide parties with credentials when the signer initially schedules the notarization event with the system provider. Each party may be provided with credentials uniquely associated with the party or credentials associated with the notarization event.

When a signer initially schedules a notarization event with a notarization system provider, a central server generates a record of the notarization event for a service database housed in the central server. The signer may identify one or more witnesses who will observe the notarization event. The signer may also identify a notary, but in some embodiments the provider may identify the notary. The central server may contact each of the identified parties using any suitable means, such as e-mail, to allow each of the parties to establish their credentials with the provider. These credentials are then stored in the database in association with the notarization event, and used later to access the notarization event after the signer launches a session for the event that is hosted by the central server.

In step 302, after a session is launched for a notarization event, a party may log into the session by any suitable means of authentication. As previously mentioned, credentials for the party may be previously established and stored in a database on a central server hosting the session. The party may enter the requisite credentials and/or identifying information for accessing the session. In some embodiments, a device operated by the party may execute software distributed by the service provider, designed for secure communications between the party's device and the central server. Upon receiving credentials associated with the party, the central server may authenticate the party by checking the service database or other suitable authentication service in order to verify that the party should be permitted access to the session. After authenticating the credentials of the party, the central server may permit the party to access the session of the notarization event. In some embodiments, the central server may establish a secure means of communication between the devices (e.g., VPN tunnel). The session may be launched by the central server for the notarization event, and remain idle until each of the parties are authenticated and available to observe execution of the electronic instrument.

In step 304, a central server may receive multimedia feeds capturing various perspectives of a notarization event, from computing devices associated with computing devices. The central server may broadcast the feeds to each of the computing devices of the notarization system. The feeds may be displayed on each of the computing devices. In some cases, the feeds displayed on a particular device may depend upon the party operating the particular device. For example, in some cases, the computing device associated with a notary may receive feeds displaying one or more perspectives of a signer. As another example, the computing device associated with a witness may receive feeds displaying a signer and a notary. It should be appreciated that the feeds received by each of the computing devices may vary according to the embodiment. The feeds displayed on each computing device may allow each party to observe the notarization event.

In step 306, a central server may provide an electronic instrument to a computing device of a signer. When the signer schedules a notarization event with the system provider, the central server may store an electronic instrument in a database record associated with the notarization event. After launching a secure session for the notarization event, the signer's computing device may download the electronic instrument from the central server. In some cases, the electronic instrument may be pre-filled with terms based on a prior agreement or automatically pre-filled with default terms based on the type of agreement. The central server may retrieve the electronic instrument from the database and transmit the instrument to the signer's device. As previously mentioned, the signer's device may execute a notary application associated with the electronic notarization system. The notary application may establish the secure connection with the central server and provide a user interface for the signer to execute the electronic instrument.

In step 308, after a signer executes an electronic instrument, a signer's device may transmit the executed instrument to a central server, which forwards the executed instrument to a computing device of a notary. The executed instrument may be displayed on a user interface of the notary's computing device. The notary device may apply a notarization token to the electronic instrument. The notarization token may be stored in any suitable non-transitory machine-readable storage memory. Examples of storage locations for the notarization token may include memory of the notary computing device, memory of the central server, a database of the electronic notarization system, and a database of the jurisdiction in which the notary is licensed. The notary's computing device may retrieve the token from the storage location and be applied to the electronic instrument. The notarization token may be applied to the computer file containing the electronic instrument. A notary application of the provider system may be installed and executed on the notary device. In some embodiments, after the notarization token is applied to the electronic instrument, the notary application may display a notary stamp on the instrument. That is, if the instrument were printed to a paper copy, the stamp may be displayed. The notary application may convert the notarized instrument to a suitable file format for displaying the signatures of the parties and the notary's stamp.

In step 310, a central server may receive a notarized electronic instrument from a notary's computing device and forward the notarized instrument to a computing device of a witness. The witness may observe various feeds displaying each of the parties of the notarization event. The witness may apply a mark (e.g., signature) associated with the witness to the electronic instrument indicating that the witness observed the notarization event. A notary application on the witness's computing device may allow the witness to apply the witness's mark on a signature block, or on a computer file associated with the notarized instrument.

In step 312, a central server may receive a notarized electronic instrument and related files from the witness's computing device and store the notarized instrument in a database record associated with the notarization event. The notarized instrument may be encrypted using any suitable algorithm and securely stored by the system provider, financial service provider, a law office, a law enforcement agency, an entity associated with the electronic instrument, or any entity agreed to securely stored the records of the notarization event. The electronic instrument may later be retrieved from the database by an authorized entity, and copies of the electronic instrument may be produced and distributed to one or more parties. In some cases, the records and the instrument may be stored with the feeds, in an archive database.

In step 314, a central server may receive feeds from each of the devices associated with a notarization event session, and then store the feeds in an archive database. The feeds may be received by the central server and displayed on an interface of each of the computing devices in real-time throughout the notarization event. After concluding the notarization event, the central server may convert the feeds into a single multimedia computer file, a so-called archive file, which displays the feeds on a user interface in synchronized playback. A notary application or other suitable software of one or more system devices may timestamp feeds in order to facilitate synchronization, which is later performed by the central server. The central server may then encrypt the archive file using any suitable encryption algorithm and store the archive file into an archive database. In some embodiments, the central server may store records associated with the notarization event into the archive database along with the multimedia archive file. Such records may include information identifying the parties, the electronic instrument, and other data memorializing the notarization event. Thus, the archive file and associated information may securely preserve a synchronized video record of each party associated with the notarization event for verification. Later, the archive file may be accessed by any suitable computing using the appropriate decryption key. It should be appreciated that the decryption key may be a symmetric key (i.e., the same key used for encryption) or an asymmetric key depending upon the encryption algorithm used. After decryption, the archive file may display the synchronized feeds on a user interface using any suitable computer, user interface, and computer program, such as a notary application or a multimedia software program.

The foregoing method descriptions and the process flow diagrams are provided merely as illustrative examples and are not intended to require or imply that the steps of the various embodiments must be performed in the order presented. The order of performing the steps on the foregoing embodiments may be varied. Words such as "then," "next," etc. are not intended to limit the order of the steps; these words are simply used to guide the reader through the description of the methods. Although process flow diagrams may describe the operations as a sequential process, some of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method of remotely notarizing instruments, the method comprising:
   capturing, by a camera of a signer computing device, a signer video feed comprising a first timestamp and a face of a signing party during at least the beginning and end of the signing party signing an electronic document;
   generating, by the signer computing device, an animation feed comprising a second timestamp and a signature of the signing party being applied to a signature block of the electronic document;
   synchronizing the signer video feed comprising the signing party signing the electronic document with the animation feed comprising the signature of the signing party being applied to the signature block of the electronic document using the first timestamp of the signer video feed and the second timestamp of the animation feed;
generating a media file comprising the signer video feed synchronized with the animation feed;
transmitting the electronic document and the media file to a notary computing device associated with a notarizing party;
receiving, by the notary computing device, the media file and execute a notarization module configured to tag, based on the media file, a notarizing token associated with a notary to the electronic document;
receiving, by a computer, from the notary computing device, the tagged electronic document; and
storing, by the computer, the tagged electronic document received from the notary computing device.

2. The computer implemented method according to claim 1, further comprising receiving, from the notary computing device, a notary feed synchronized with at least one of the signer video feed or the animation feed.

3. The computer implemented method according to claim 1, further comprising storing, the tagged electronic document received from the notary computing device in an archive database.

4. The computer implemented method according to claim 1, further comprising storing the tagged electronic document and the media file in an archive database.

5. The computer implemented method according to claim 4, further comprising:
aggregating the animation feed, the signer video feed, and each of a plurality of video feeds; and
storing, by the computer, each of the animation and signer video feeds in an archive database.

6. The computer implemented method according to claim 1, further comprising transmitting, by the computer, the animation feed and the signer video feed to a witness computing device associated with a witness.

7. The computer implemented method according to claim 6, further comprising presenting, by the computer, the electronic document having the signature of the signing party to the witness computing device.

8. The computer implemented method according to claim 6, further comprising receiving, by the computer, a witness video feed from the witness computing device capturing the witness applying a witness signature to the electronic document, wherein the witness video feed is captured by a camera associated with the witness computing device.

9. The computer implemented method according to claim 1, further comprising receiving, by the computer, a notary video feed from the notary computing device capturing the notary applying a signature to the electronic document, wherein the notary video feed is captured by a camera associated with the notary computing device.

10. The computer implemented method according to claim 1, wherein the notarizing token associated with the notary is selected from the group consisting of: a public encryption key, a private encryption key, a symmetric encryption key, a digital watermark, and a hash value.

11. The computer implemented method according to claim 1, wherein the notary computing device receives the animation feed and the signer video feed substantially in real time.

12. A system for creating a computer file having a notarized electronic instrument, the system comprising:
a signer computing device comprising:
a video camera configured to capture a signer video feed comprising a first timestamp and a face of a signing party during at least the beginning and end of the signing party signing an electronic document in a signer video feed;
a processor configured to:
generate an animation feed comprising a second timestamp and a signature of the signing party being applied to a signature block of the electronic document;
synchronize the signer video feed comprising the signing party signing the electronic document with the animation feed comprising the signature of the signing party being applied to the signature block of the electronic document using the first timestamp of the signer video feed and the second timestamp of the animation feed; and
generate a media file comprising the signer video feed synchronized with the animation feed; and
a notary computing device comprising:
a processor configured to:
receive the media file and execute a notarization module configured to attach, based on the media file, a notary token of a notary to the electronic document; and
a computer comprising a processor configured to store the tagged electronic document from the notary computing device.

13. The system according to claim 12, wherein the notarizing module is configured to draw a stamp on the electronic document, wherein the stamp comprises a visual replica of a notary stamp for a jurisdiction of a notary.

14. The system according to claim 12, wherein the notary token is selected from the group consisting of: a public key, a private key, a digital signature, a watermark, and a hash.

15. The system according to claim 12, further comprising a witness computing device comprising a processor configured to receive the media file.

16. The system according to claim 15, further comprising a camera associated with the witness computing device configured to capture a witness in a witness video feed.

17. The system according to claim 15, wherein the processor of the witness computing device is configured to transmit a verification file containing a verification document having the signature of the witness.

* * * * *